US011010962B1

(12) United States Patent
Livingston

(10) Patent No.: US 11,010,962 B1
(45) Date of Patent: May 18, 2021

(54) SYSTEMS AND METHODS FOR FACILITATING GENERATION OF 3D DIGITAL OBJECTS FROM 2D IMAGES

(71) Applicant: Morson R. Livingston, Land o Lakes, FL (US)

(72) Inventor: Morson R. Livingston, Land o Lakes, FL (US)

(*) Notice: Subject to any disclaimer, the term of this patent is extended or adjusted under 35 U.S.C. 154(b) by 0 days.

(21) Appl. No.: 16/663,194

(22) Filed: Oct. 24, 2019

(51) Int. Cl.

| | |
|---|---|
| ***G06T 15/20*** | (2011.01) |
| ***H04N 13/194*** | (2018.01) |
| ***G06T 17/10*** | (2006.01) |

(52) U.S. Cl.
CPC ............ *G06T 15/205* (2013.01); *G06T 17/10* (2013.01); *H04N 13/194* (2018.05)

(58) Field of Classification Search
None
See application file for complete search history.

(56) References Cited

U.S. PATENT DOCUMENTS

2013/0322708 A1* 12/2013 Heringslack ....... G06K 9/00268 382/118
2020/0068188 A1* 2/2020 Maeda .................. H04N 5/232

* cited by examiner

*Primary Examiner* — Robert J Craddock

(57) ABSTRACT

Disclosed herein is a method of facilitating the generation of 3D digital objects from 2D images. Accordingly, the method may include a step of receiving a plurality of 2D images associated with a 3D object from at least one user device. Further, the method may include a step of processing at least one 2D image of the plurality of 2D images to identify the 3D object. Further, the method may include a step of retrieving at least one additional 2D image associated with the 3D object from a database based on the processing. Further, the method may include a step of analyzing the plurality of 2D images and the at least one additional 2D image. Further, the method may include a step of generating a 3D digital object based on the analyzing. Further, the method may include a step of storing the 3D digital object.

20 Claims, 12 Drawing Sheets

100

112

- OBJECT SENSOR DATA
- PLURALITY OF 2D IMAGES
- 3D DIGITAL OBJECTS
- PLURALITY OF RESPONSES
- AT LEAST ONE QUERY
- TRANSACTIONAL ACTION
- FACET
- ADDITIONAL 2D IMAGE

106

104

102

110

1200

114

116

SYSTEMS AND METHODS FOR FACILITATING GENERATION OF 3D DIGITAL OBJECTS FROM 2D IMAGES

TECHNICAL FIELD

Generally, the present disclosure relates to the field of data processing. More specifically, the present disclosure relates to systems and methods for facilitating the generation of 3D digital objects from 2D images.

BACKGROUND

The field of image processing is technologically important to several industries, business organizations and/or individuals. In particular, the image processing is employed for generating 3D digital objects from 2D images.

Existing techniques for generating a 3D digital object from 2D images are deficient with regard to several aspects. For instance, current technologies do not allow a user to view activities (such as updates, 2D images, 3D digital objects, etc.) associated with other users. Further, the current technologies do not allow the user to search and filter the 3D digital objects. Further, the current technologies do not allow the user to make a remark (such as comment, like, etc.) on the 3D digital objects associated with the other users. Furthermore, current technologies do not allow the user to send the 3D digital objects to the other users. Moreover, current technologies do not allow the user to store the 3D digital objects over the cloud storage portal.

Therefore, there is a need for improved methods and systems for facilitating the generation of 3D digital objects from 2D images that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating the generation of 3D digital objects from 2D images, in accordance with some embodiments. Accordingly, the method may include a step of receiving, using a communication device, a plurality of 2D images associated with a 3D object from at least one user device. Further, the method may include a step of processing, using a processing device, at least one 2D image of the plurality of 2D images to identify the 3D object. Further, the method may include a step of retrieving, using a storage device, at least one additional 2D image associated with the 3D object from a database based on the processing. Further, the method may include a step of analyzing, using the processing device, the plurality of 2D images and the at least one additional 2D image. Further, the method may include a step of generating, using the processing device, a 3D digital object based on the analyzing. Further, the method may include a step of storing, using the storage device, the 3D digital object.

Further disclosed herein is a system for facilitating the generation of 3D digital objects from 2D images, in accordance with some embodiments. Accordingly, the system may include a communication device configured for receiving a plurality of 2D images associated with a 3D object from at least one user device. Further, the at least one user device may include at least one image sensor. Further, the at least one image sensor may be configured to generate the plurality of 2D images. Further, the system may include a processing device configured for processing at least one 2D image of the plurality of 2D images to identify the 3D object. Further, the processing device may be configured for analyzing the plurality of 2D images and at least one additional 2D image. Further, the processing device may be configured for generating a 3D digital object based on the analyzing. Further, the system may include a storage device configured for retrieving the at least one additional 2D image associated with the 3D object from a database based on the processing. Further, the storage device may be configured for storing the 3D digital object.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
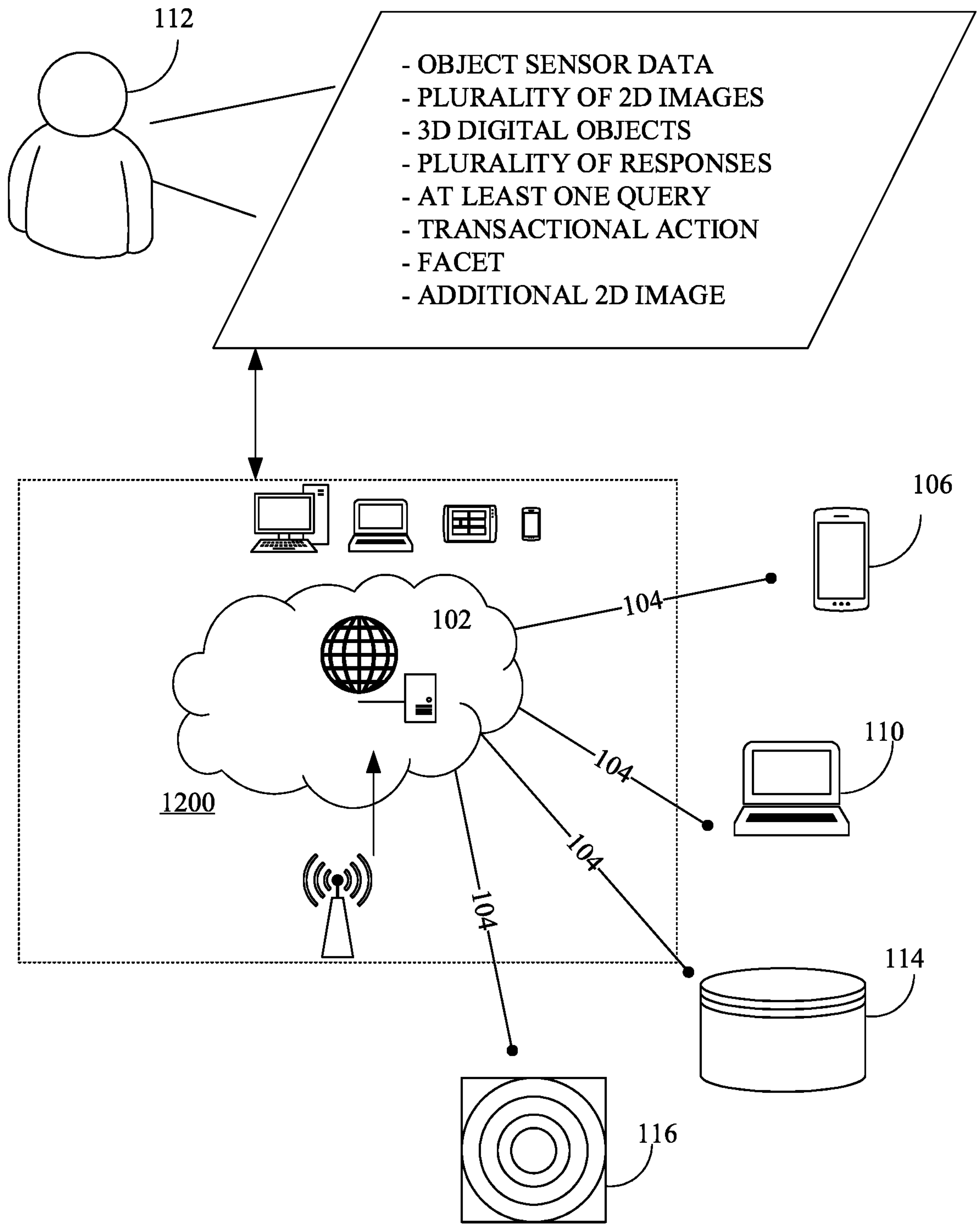
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods to facilitate the generation of 3D digital objects from 2D images, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure may describe methods that may facilitate the generation of a 3D digital object from a plurality of 2D images. Further, the present disclosure discloses a software application for Apple™ IOS and Android™ devices. Further, the mobile phone camera may assist the software application to generate (create) a 3D digital object (3D photo). Upon generating the 3D object, a software application may store digital content (such as 3D digital object, 2D image, etc.) on a cloud storage portal. Further, the digital content may be transmitted (or provided) to different sector companies such as insurance, e-commerce, or advertisement.

Further, the software application may work on iPhone™ and Android™ devices. Further, a user may log in to the software application by using social media credentials associated with the user account or by generating login credentials. Further, the social media credentials may include an email address and a password associated with the social media profile of the user. Further, the user may generate the new login credentials to log in to the software application. Further, the new login credentials may include a username and a password associated with the user. Further, the generation of the profile may include providing account details (inputs) to the software application. Further, the account details may include a photo, a name, an e-mail, a nickname, a phone number, a location, an about me, a password, etc. Further, the user may edit the profile later after generating it. Further, the software application may include an Activity link. Further, the Activity link may allow the user to view activities associated with other users. Further, the activities may include capturing (taking) and sharing the 2D images (photos), 3D digital objects, and so on. Further, the software application may allow the user to share the 2D images and 3D digital objects with the other users. Further, the user may be able to view subscriber sharing associated with the other user, provided the user is following the other user. Further, the user may be able to view exemplary 3D digital objects, upon clicking Help link. Further, the software application may allow the user to view Support links.

Further, the present disclosure may allow the user to view the 3D digital objects associated with the other user, upon opening the software application. Further, the user may select the 3D digital object to view the comments, number of likes associated with the 3D digital object. Further, the user may share the 3D digital object to a social media network. Further, the social media network may include Facebook™, Instagram™, and so on. Further, a Search box may allow the user to search for the 3D digital object. Furthermore, the software application may display the 3D digital object associated with the other users corresponding to a search query made by the user. Further, the user may include filters for searching the 3D digital objects. Further, the filters may include nearby, popular, trending, etc. Further, the user may also comment or like the 3D digital object associated with the other users. Further, the user may add hashtags to the 3D digital objects. Further, the software application may provide the user with a follower list. Further, the follower list may include the other users that may want to follow the user and receive updates associated with the user. Further, the user may capture the 2D image (photo) in Manual Mode, Panorama Mode, Object Mode. Further, the software application may allow the user to search the other users by name of the other users. Further, the user may add new friends, with the social media network account, to profile associated with the user. Further, the new friends may include the other users that may want to interact with the user. Further, the software application may recommend the user to add the other user to the profile associated with the user. Further, the software application may allow the user to chat with the other users. Further, the chat may allow the user to send conversation texts, 3D digital objects, etc. to the other users. Further, the software application may allow the user to save the data to a cloud storage portal. Further, the user may be an insurance company that may have the enterprise-level subscription associated with the software application. Further, the software application may save the 3D digital objects associated with the insurance company corresponding to a policy number of the other user. Further, the insurance company may be able to view history associated with the policy number, upon logging on the cloud storage portal and searching for the policy number. Further, the history may include the details associated with the policy number. Further, the details may include 3D digital objects for an event (such as car accident).

Referring now to figures, FIG. 1 is an illustration of an online platform 100 consistent with various embodiments of the present disclosure. By way of non-limiting example, the online platform 100 to facilitate the generation of 3D digital objects from 2D images may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, photographers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a software application compatible with a computing device 1200.

Figure 2:
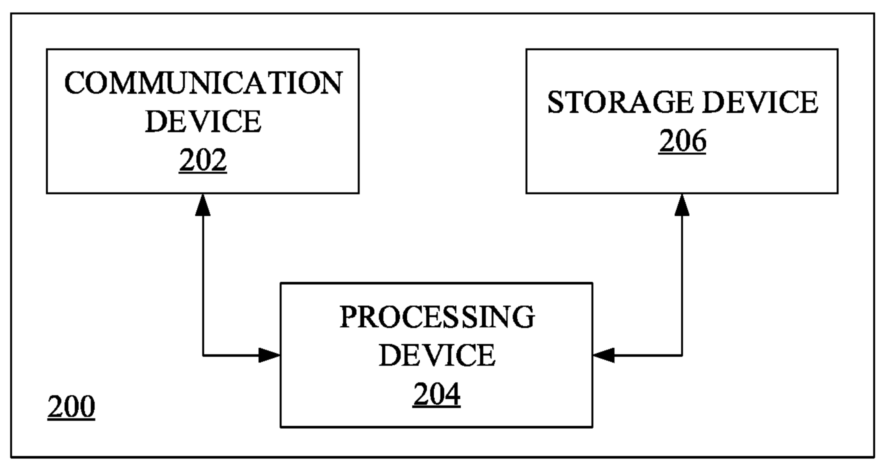
FIG. 2 is a block diagram of a system configured for generation of 3D digital objects from 2D images, in accordance with some embodiments.

FIG. 2 is a block diagram of a system 200 for facilitating the generation of 3D digital objects from 2D images, in accordance with some embodiments. Accordingly, the system 200 may include a communication device 202, a processing device 204, and a storage device 206.

Further, the communication device 202 may be configured for receiving a plurality of 2D images associated with a 3D object from at least one user device (such as the mobile device 106 and an electronic device in the other electronic devices 110). Further, the at least one user device may include at least one image sensor (such as a sensor in the sensors 116). Further, the at least one image sensor may be configured to generate the plurality of 2D images. Further, a 2-Dimensional (2D) image of the plurality of 2D images may refer to binary representation of at least one visual information. Further, the at least one visual information may include drawing, picture, graph, logo, etc. Further, the 2D image may be associated with at least one format. Further, the at least one format may include .JPEG, .GIF, .PNG, .BMP, .PGM, .BAT, .BPG and so on. Further, the at least one user (such as a user in the user 112) may include an individual, an institution, and an organization that may want to generate 3D digital objects from 2D images. Further, the 3D digital object may refer to a 3D geometric representation of the at least one 3D object, that may be stored and displayed on the at least one user device. Further, the at least one user device may be associated with the at least one user. Further, the at least one user device may include a smartphone, a tablet, a laptop, a personal computer and so on. Further, the at least one image sensor may include a device that may be configured to convert an optical image into an electronic signal. Further, the at least one image sensor may include a Charge-Coupled Device (CCD), Complementary Metal-Oxide Semiconductor (CMOS), and so on. Further, the 3-Dimensional (3D) object may include a physical object. Further, the physical object may refer to a collection of matter within a defined contiguous body in three-dimensional space.

Further, the processing device 204 may be configured for processing at least one 2D image of the plurality of 2D images to identify the 3D object. Further, the processing device 204 may be configured for analyzing the plurality of 2D images and at least one additional 2D image. Further, the at least one 2D additional image may refer to a binary representation of at least one visual information. Further, the at least one visual information may include drawing, picture, graph, logo, etc. Further, the at least one 2D additional image may be associated with the at least one format. Further, the at least one additional 2D image may be associated with the at least one 2D image. Further, the processing device 204 may be configured for generating a 3D digital object based on the analyzing.

Further, the storage device 206 may be configured for retrieving the at least one additional 2D image associated with the 3D object from a database (such as a database in the databases 114) based on the processing. Further, the storage device 206 may be configured for storing the 3D digital object.

Further, in some embodiments, the at least one image sensor may be configured to be positioned at a plurality of viewpoints to generate the plurality of 2D images corresponding to the plurality of viewpoints. Further, the plurality of viewpoints may be associated with the 3D object. Further, the plurality of viewpoints may lie on at least one curve. Further, the at least one curve may encompass the 3D object along at least one plane. Further, the at least one plane may pass through the 3D object.

Further, in some embodiments, the at least one 2D image may include a representation of a predetermined reference object. Further, the processing device 204 may be configured for analyzing the at least one 2D image to identify the predetermined reference object. Further, the processing device 204 may be configured for determining the at least one 3D object parameter based on the analyzing. Further, the processing device 204 may be configured for generating the 3D digital object based on the plurality of 2D images and the at least one 3D object parameter. Further, the predetermined reference object may include a 3D object that may facilitate the determination of at least one 3D object parameter. Further, the at least one 3D object parameter may include length, breadth, height, and so on, that may be associated with the at least one 3D object. Further, the 3D digital object may refer to a 3D geometric representation of the at least one 3D object, that may be stored and displayed on the at least one user device.

In further embodiments, the communication device 202 may be configured for receiving at least one object sensor data associated with the 3D object from the at least one user device. Further, the at least one user device may include at least one object sensor (such as a sensor in the sensors 116). Further, the at least one object sensor may be configured to generate the at least one object sensor data. Further, the processing device 204 may be configured for analyzing the plurality of 2D images and the at least one object sensor data to obtain at least one 3D object parameter. Further, the processing device 204 may be configured for generating the 3D digital object based on the plurality of 2D images and the at least one 3D object parameter. Further, the object sensor may include the at least one image sensor, proximity sensor, gyro sensor, etc. Further, the proximity sensor may include a device that may facilitate the detection of the presence of the at least one nearby 3D object without any physical contact. Further, the gyro sensor may include a device that may facilitate the determination of orientation associated with the at least one user device. Further, the at least one object sensor data may include an image sensor data, a proximity sensor data, a gyro sensor data, etc. Further, the image sensor data may include the 2D image associated with the 3D object. Further, the proximity sensor data may include a measure of proximity between the 3D object and the at least one user device. Further, the measure of proximity may include distance. Further, the gyro sensor data may include a measure of orientation associated with the at least one user device. Further, the measure of orientation may include angular velocity.

In further embodiments, the communication device 202 may be configured for receiving at least one query from the at least one user device associated with the at least one user. Further, the communication device 202 may be configured for transmitting the 3D digital object to the at least one user device. Further, the processing device 204 may be configured for analyzing the at least one query. Further, the storage device 206 may be configured for retrieving the 3D digital object from a database. Further, the query may be associated with the 3D object. Further, the query may include a search entity that the at least one user may want to search.

In further embodiments, the communication device 202 may be configured for transmitting the 3D digital object to a first user device (such as the mobile device 106 and an electronic device in the other electronic devices 110) associated with a first user. Further, the first user device may be communicatively coupled with a plurality of user devices (such as the other electronic devices 110) over at least one of a wired communication channel and a wireless communication channel. Further, the plurality of user devices may include computing devices, but not limited to, smartphones, tablets, laptops, personal computers, and so on. Further, the first user device may be configured to transmit the 3D digital object to the plurality of user devices associated with a plurality of users. Further, the communication device 202 may be configured for receiving a plurality of responses associated with the 3D digital object from the plurality of user devices. Further, the communication device 202 may be configured for transmitting the plurality of responses associated with the 3D digital object to the plurality of user devices. Further, the first user (such as a user in the user 112) may be an individual, an institution, and an organization that may want to share the 3D object with the at least one user. Further, the first user device may include a smartphone, a tablet, a laptop, a personal computer and, so on. Further, the plurality of response may include measures of appraisal. Further, the measure of appraisal may include a like, a comment, a re-share, a dislike, etc.

Further, in some embodiments, the 3D digital object may be associated with three reference axes. Further, the three reference axes may be mutually perpendicular. Further, the three reference axes may include a vertical reference axis, a lateral reference axis, and a longitudinal reference axis. Further, the 3D digital object may be configured to rotate about an axis through a plurality of positions. Further, the axis may be determined through a plurality of coordinates associated with each of the vertical reference axis, the lateral reference axis, and the longitudinal reference axis. Further, the plurality of positions may correspond to a plurality of facets associated with the 3D digital object.

In further embodiments, the communication device 202 may be configured for receiving a transitional action associated with the 3D digital object from the at least one user device. Further, the transitional action may be associated with the axis about which the 3D digital object rotates through the plurality of positions. Further, the communication device 202 may be configured for transmitting the facet to the at least one user device. Further, the processing device 204 may be configured for analyzing the transitional action to determine the position of the 3D digital object about the axis. Further, the processing device 204 may be configured for generating the facet corresponding to the position based on the analyzing. Further, the facet may include a perspective view of the 3D digital object associated with the axis.

Further, in some embodiments, the at least one user device may include at least one action sensor (such as a sensor in the sensors 116). Further, the at least one action sensor may be configured to generate the transitional action. Further, the action sensor may include an infrared projector, a touch panel. Further, the infrared projector may generate an infrared grid that may facilitate the determination of the transactional action associated with the at least one user. Further, the touch panel may be associated with the at least one user device. Further, the at least one user may perform the transition action, upon swiping the touch panel.

In further embodiments, the processing device 204 may be configured for identifying a transitional sound corresponding to the facet. Further, the communication device 202 may be configured for transmitting the facet and the transitional sound to the at least one user device. Further, the transitional sound may include a noise alert that may facilitate the identification of the facet that may be displayed on the at least one user device.

Figure 3:
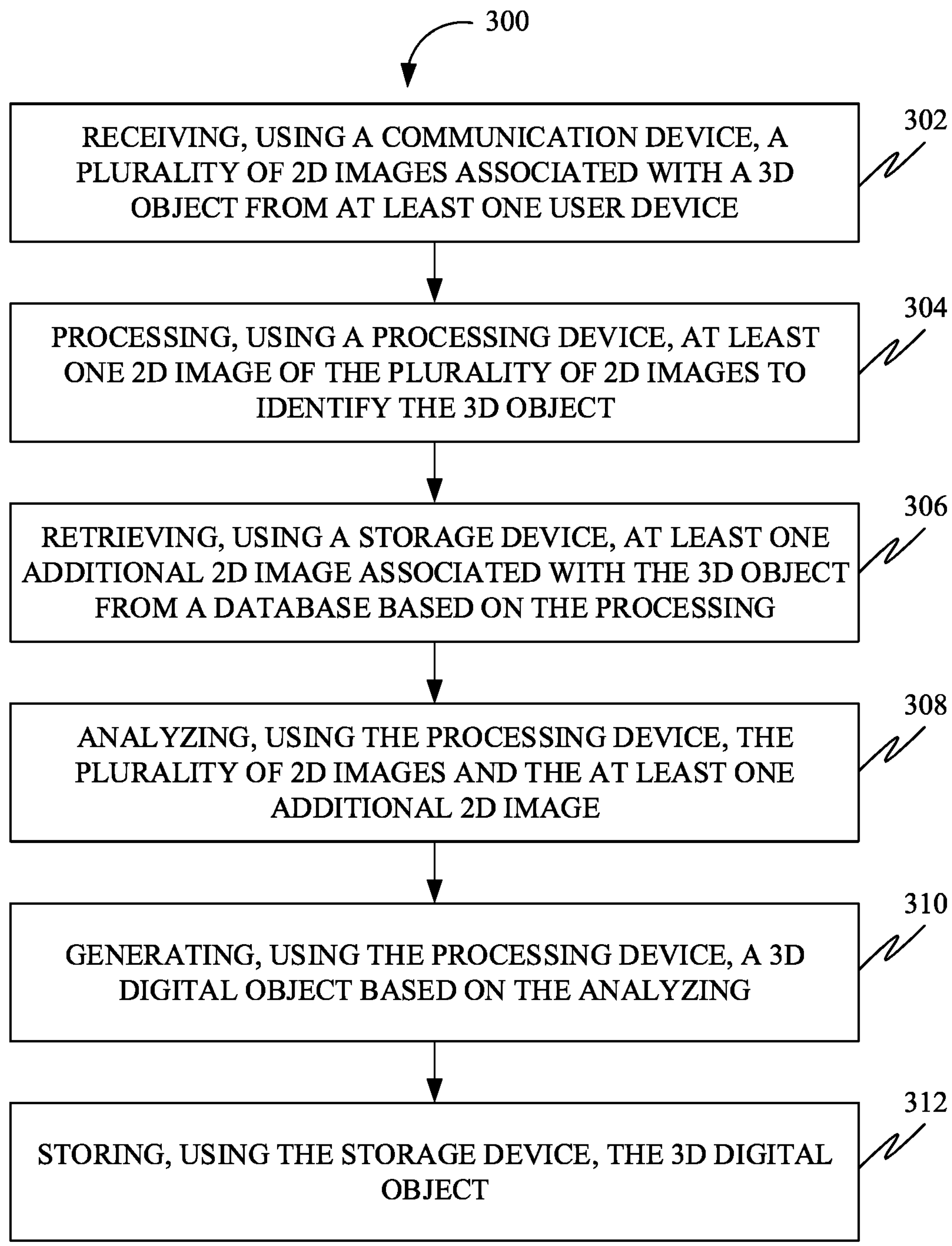
FIG. 3 is a flowchart of a method to facilitate the generation of 3D digital objects from 2D images, in accordance with some embodiments.

FIG. 3 is a flowchart of a method 300 for facilitating the generation of 3D digital objects from 2D images, in accordance with some embodiments. Accordingly, at 302, the method 300 may include a step of receiving, using a communication device, a plurality of 2D images associated with a 3D object from at least one user device. Further, a 2D image of the plurality of 2D images may refer to binary representation of at least one visual information. Further, the at least one visual information may include drawing, picture, graph, logo, etc. Further, the 2D image may be associated with at least one format. Further, the at least one format may include .JPEG, .GIF, .PNG, .BMP, .PGM, .BAT, .BPG and so on. Further, the at least one user device may include at least one image sensor. Further, the at least one user may include an individual, an institution, and an organization that may want to generate 3D digital objects from 2D images. Further, the at least one user device may be associated with the at least one user. Further, the at least one user device may include a smartphone, a tablet, a laptop, a personal computer and so on. Further, the at least one image sensor may be configured to generate the plurality of 2D images. Further, the at least one image sensor may include a device that may be configured to convert an optical image into an electronic signal. Further, the at least one image sensor may include a Charge-Coupled device (CCD), Complementary Metal-Oxide Semiconductor (CMOS), and so on. Further, in some embodiments, the at least one image sensor may be configured to be positioned at a plurality of viewpoints to generate the plurality of 2D images corresponding to the plurality of viewpoints. Further, the plurality of viewpoints may be associated with the 3D object. Further, the 3D object may include a physical object. Further, the physical object may refer to a collection of matter within a defined contiguous body in 3D space. Further, the plurality of viewpoints may lie on at least one curve. Further, the at least one curve may encompass the 3D object along at least one plane. Further, the at least one plane may pass through the 3D object.

Further, at 304, the method 300 may include a step of processing, using a processing device, at least one 2D image of the plurality of 2D images to identify the 3D object.

Further, at 306, the method 300 may include a step of retrieving, using a storage device, at least one additional 2D image associated with the 3D object from a database based on the processing. Further, the at least one 2D additional image may refer to a binary representation of at least one visual information. Further, the at least one 2D additional image may be associated with the at least one format. Further, the at least one visual information may include drawing, picture, graph, logo, etc. Further, the at least one additional 2D image may be associated with the at least one 2D image.

Further, at 308, the method 300 may include a step of analyzing, using the processing device, the plurality of 2D images and the at least one additional 2D image.

Further, at 310, the method 300 may include a step of generating, using the processing device, a 3D digital object based on the analyzing. Further, the 3D digital object may refer to a 3D mathematical representation of the at least one 3D object, that may be stored and displayed on the at least one user device.

Further, at 312, the method 300 may include a step of storing, using the storage device, the 3D digital object.

Further, in some embodiments, the 3D digital object may be associated with three reference axes. Further, the three reference axes are mutually perpendicular. Further, the three reference axes may include a vertical reference axis, a lateral reference axis, and a longitudinal reference axis. Further, the 3D digital object may be configured to rotate about an axis through a plurality of positions. Further, the axis may be determined through a plurality of coordinates associated with each of the vertical reference axis, the lateral reference axis, and the longitudinal reference axis. Further, the plurality of positions may correspond to a plurality of facets associated with the 3D digital object. Further, the facet may include a perspective view of the 3D digital object associated with the axis.

Figure 4:
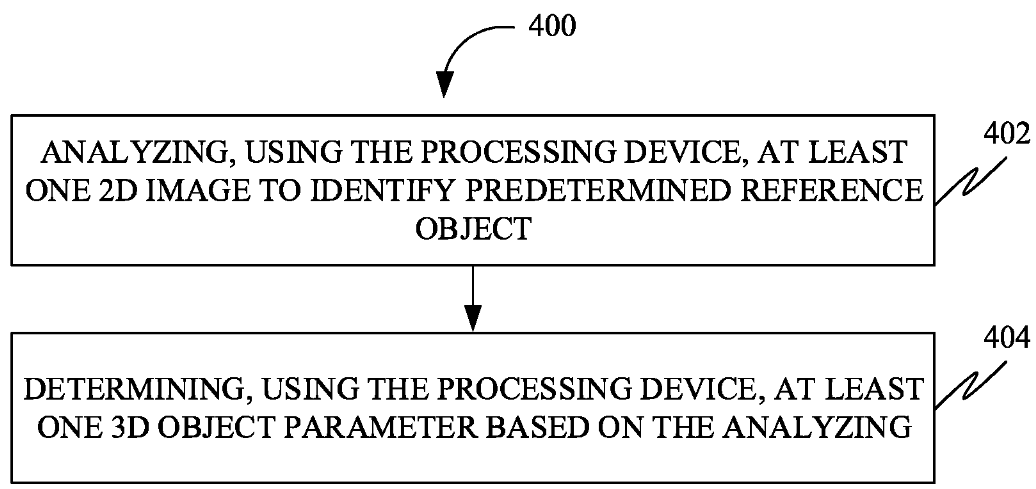
FIG. 4 is a flowchart of a method for facilitating the generation of 3D digital objects based on 3D object parameter, in accordance with some embodiments.

FIG. 4 is a flowchart of a method 400 for facilitating the generation of 3D digital objects based on 3D object parameter, in accordance with some embodiments. Accordingly, at 402, the method 400 may include a step of analyzing, using the processing device, at least one 2D image to identify predetermined reference object. Further, a 2D image of the plurality of 2D images may refer to a binary representation of at least one visual information. Further, the at least one visual information may include drawing, picture, graph, logo, etc. Further, the 2D image may be associated with at least one format. Further, the at least one format may include .JPEG, .GIF, .PNG, .BMP, .PGM, .BAT, .BPG and so on. Further, the at least one 2D image may include a representation of the predetermined reference object. Further, the predetermined reference object may include a 3D object that may facilitate the determination of at least one 3D object parameter. Further, the at least one 3D object parameter may include dimension associated with the at least one 3D object. Further, the dimension may include length, breadth, height, and so on, Further, at 404, the method 400 may include a step of determining, using the processing device, at least one 3D object parameter based on the analyzing. Further, the processing device 204 may be configured to generate the 3D digital object based on the plurality of 2D images and the at least one 3D object parameter.

Figure 5:
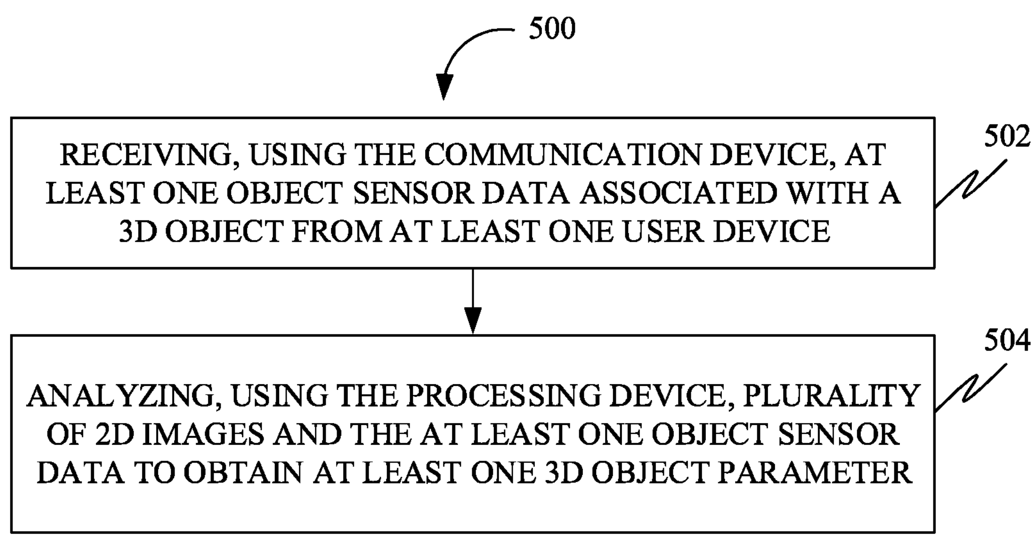
FIG. 5 is a flowchart of a method for obtaining the 3D object parameter based on analyzing the 2D images and object sensor data, in accordance with some embodiments.

FIG. 5 is a flowchart of a method 500 for obtaining the 3D object parameter based on analyzing the 2D images and object sensor data, in accordance with some embodiments. Accordingly, at 502, the method 500 may include a step of receiving, using the communication device, at least one object sensor data associated with a 3D object from at least one user device. Further, the 3D object may include a physical object. Further, the physical object may refer to a collection of matter within a defined contiguous body in 3D space. Further, the at least one user device may include at least one object sensor. Further, the at least one user may include an individual, an institution, and an organization that may want to generate 3D digital objects from 2D images. Further, the at least one user device may be associated with the at least one user. Further, the at least one user device may include a smartphone, a tablet, a laptop, a personal computer and so on. Further, the at least one object sensor may be configured to generate the at least one object sensor data. Further, the object sensor may include the at least one image sensor, proximity sensor, gyro sensor, etc. Further, the proximity sensor may include a device that may facilitate the detection of the presence of the at least one nearby 3D object without any physical contact. Further, the gyro sensor may include a device that may facilitate the determination of orientation associated with the at least one user device. Further, the at least one object sensor data may include an image sensor data, a proximity sensor data, a gyro sensor data. Further, the image sensor data may include the 2D image associated with the 3D object. Further, the proximity sensor data may include a measure of proximity between the 3D object and the at least one user device. Further, the measure of proximity may include distance. Further, the gyro sensor data may include a measure of orientation associated with the at least one user device. Further, the measure of orientation may include angular velocity.

Figure 6:
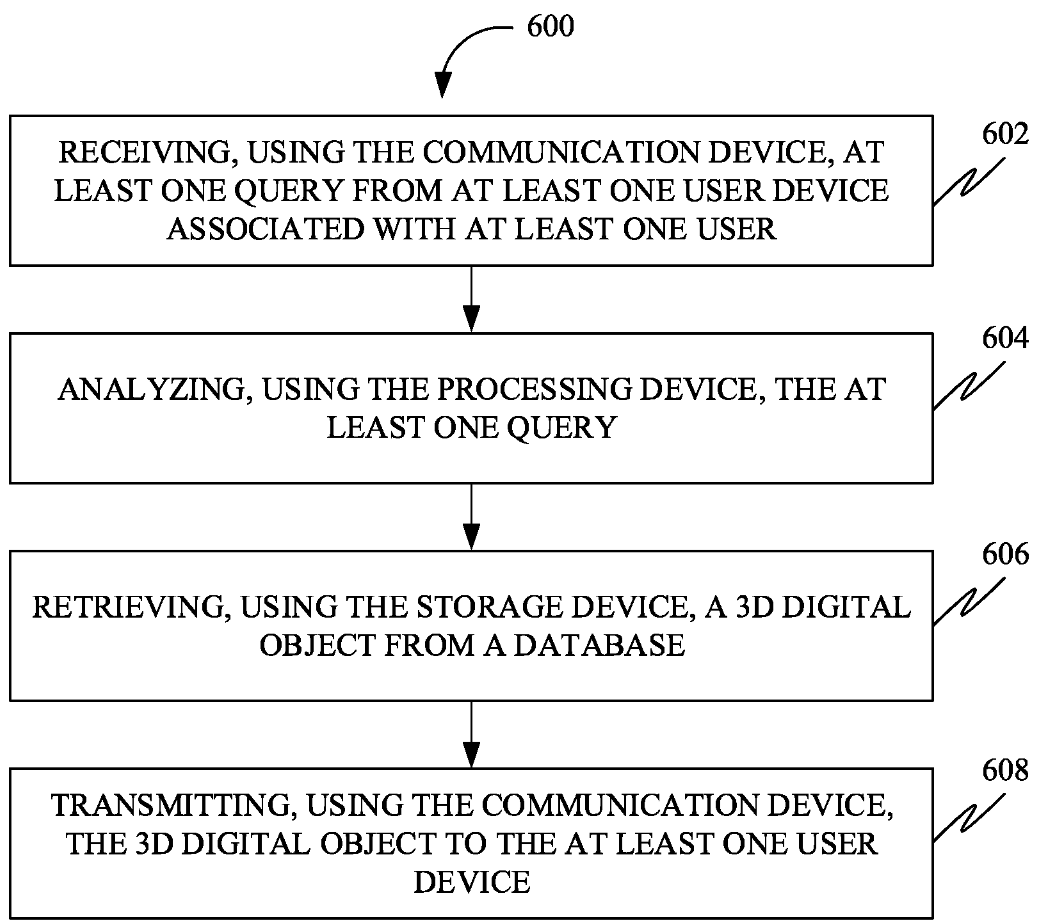
FIG. 6 is a flowchart of a method for facilitating the retrieval of the 3D digital object based on a query, in accordance with some embodiments.

Further, at 504, the method may include a step of analyzing, using the processing device, the plurality of 2D images and the at least one object sensor data to obtain at least one 3D object parameter. Further, the processing device 204 may be configured to generate the 3D digital object based on the plurality of 2D images and the at least one 3D object parameter. Further, a 2D image of the plurality of 2D images may refer to binary representation of at least one visual information. Further, the at least one visual information may include drawing, picture, graph, logo, etc. Further, the 2D image may be associated with at least one format. Further, the at least one format may include .JPEG, .GIF, .PNG, .BMP, .PGM, .BAT, .BPG and so on. Further, the 3D digital object may refer to a 3D geometric representation of the at least one 3D object, that may be stored and displayed on the at least one user device. Further, the at least one 3D object parameter may include dimension associated with the at least one 3D object. Further, the dimension may include length, breadth, height, and so on, FIG. 6 is a flowchart of a method 600 for facilitating the retrieval of the 3D digital object based on a query, in accordance with some embodiments. Accordingly, at 602, the method 600 may include a step of receiving, using the communication device, at least one query from at least one user device associated with at least one user. Further, the query may be associated with the 3D object. Further, the query may include a search entity that the at least one user may want to search. Further, the at least one user may include an individual, an institution, and an organization that may want to generate 3D digital objects from 2D images. Further, the at least one user device may be associated with the at least one user. Further, the at least one user device may include a smartphone, a tablet, a laptop, a personal computer and so on.

Further, at 604, the method 600 may include a step of analyzing, using the processing device, the at least one query.

Further, at 606, the method 600 may include a step of retrieving, using the storage device, a 3D digital object from a database. Further, the 3D digital object may refer to a 3D geometric representation of the at least one 3D object, that may be stored and displayed on the at least one user device.

Further, at 608, the method 600 may include a step of transmitting, using the communication device, the 3D digital object to the at least one user device.

Figure 7:
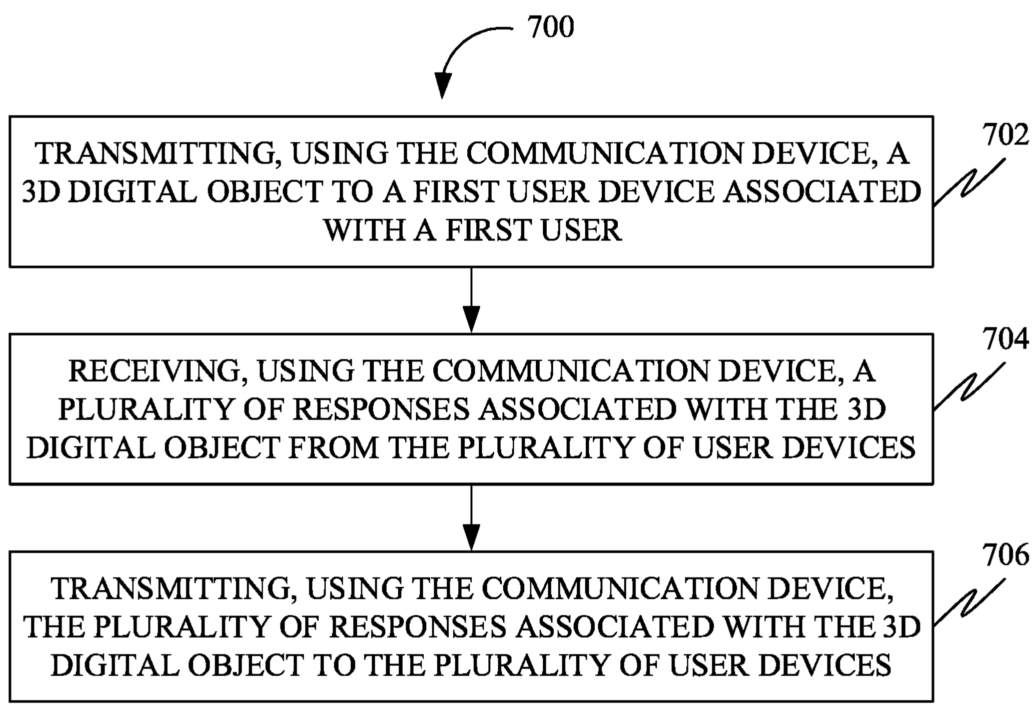
FIG. 7 is a flowchart of a method for transmitting a response associated with the 3D digital object, in accordance with some embodiments

FIG. 7 is a flowchart of a method 700 for transmitting the response associated with the at least one 3D digital object, in accordance with some embodiments. Accordingly, at 702, the method 700 may include a step of transmitting, using the communication device, a 3D digital object to a first user device associated with a first user. Further, the 3D digital object may refer to a 3D geometric representation of the at least one 3D object, that may be stored and displayed on the at least one user device. Further, the first user may be an individual, an institution, and an organization that may want to share the 3D object with the at least one user. Further, the first user device may include a smartphone, a tablet, a laptop, a personal computer and, so on. Further, the first user device may be communicatively coupled with a plurality of user devices over at least one of a wired communication channel and a wireless communication channel. Further, the plurality of user devices may be associated with the at least one user. Further, the plurality of user devices may include computing devices, but not limited to, smartphones, tablets, laptops, personal computers and so on. Further, the first user device may be configured to transmit the 3D digital object to the plurality of user devices associated with a plurality of users.

Further, at 704, the method 700 may include a step of receiving, using the communication device, a plurality of responses associated with the 3D digital object from the plurality of user devices. Further, the plurality of responses may include measures of appraisal. Further, the measure of appraisal may include a like, a comment, a re-share, a dislike, etc.

Further, at 706, the method 700 may include a step of transmitting, using the communication device, the plurality of responses associated with the 3D digital object to the plurality of user devices.

Figure 8:
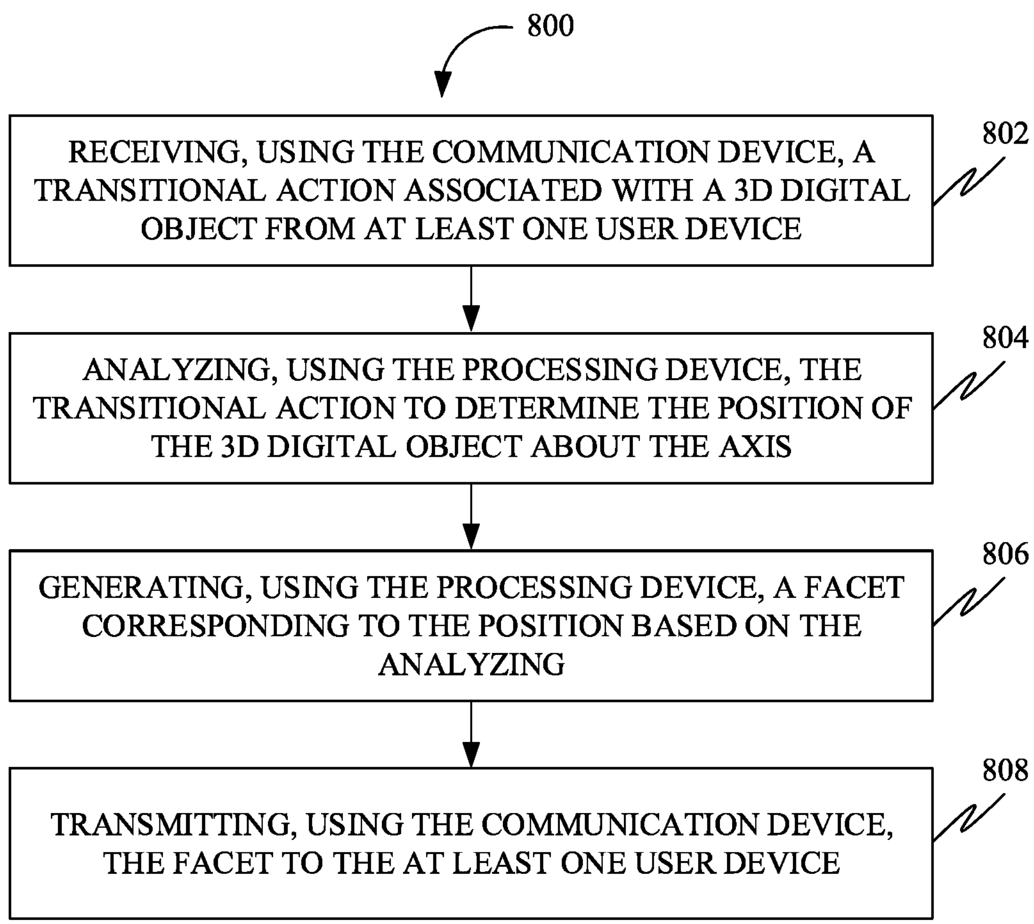
FIG. 8 is a flowchart of a method for facilitating the generation of a facet based on a transitional action, in accordance with some embodiments.

FIG. 8 is a flowchart of a method 800 for facilitating the generation of a facet based on a transitional action, in accordance with some embodiments. Accordingly, at 802, the method 800 may include a step of receiving, using the communication device, a transitional action associated with a 3D digital object from at least one user device. Further, the at least one user device may be associated with the at least one user. Further, the at least one user device may include a smartphone, a tablet, a laptop, a personal computer and so on. Further, the 3D digital object may refer to a 3D geometric representation of the at least one 3D object, that may be stored and displayed on the at least one user device. Further, the transitional action may be associated with the axis about which the 3D digital object rotates through the plurality of positions. Further, in some embodiments, the at least one user device may include at least one action sensor. Further, the at least one action sensor may be configured to generate the transitional action. Further, the action sensor may include an infrared projector, a touch panel. Further, the infrared projector may generate an infrared grid that may facilitate the determination of the transactional action associated with the at least one user. Further, the touch panel may be associated with the at least one user device. Further, the at least one user may perform the transition action, upon swiping the touch panel.

Further, at 804, the method 800 may include a step of analyzing, using the processing device, the transitional action to determine the position of the 3D digital object about the axis. Further, the 3D object may include a physical object. Further, the physical object may refer to a collection of matter within a defined contiguous body in 3D space.

Further, at 806, the method 800 may include a step of generating, using the processing device, a facet corresponding to the position based on the analyzing. Further, the facet may include a perspective view of the 3D digital object associated with the axis.

Further, at 808, the method 800 may include a step of transmitting, using the communication device, the facet to the at least one user device.

Figure 9:
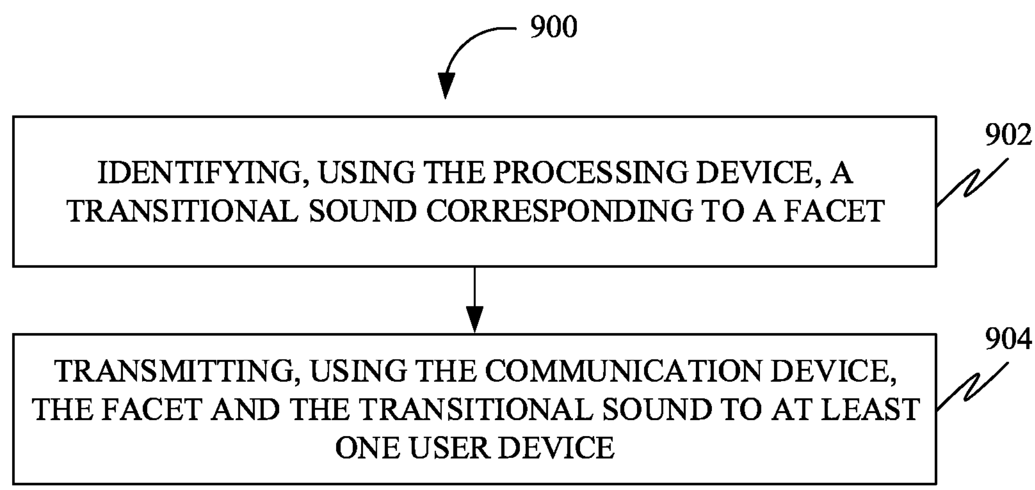
FIG. 9 is a flowchart of a method for identifying the transitional sound, in accordance with some embodiments.

FIG. 9 is a flowchart of a method 900 for identifying the transitional sound, in accordance with some embodiments. Accordingly, at 902, the method 900 may include a step of identifying, using the processing device, a transitional sound corresponding to a facet. Further, the transitional sound may include a noise alert that may facilitate the identification of the facet that may be displayed on the at least one user device. Further, the facet may include a perspective view of the 3D digital object associated with the axis.

Further, at 904, the method 900 may include a step of transmitting, using the communication device, the facet and the transitional sound to at least one user device. Further, the at least one user device may be associated with the at least one user. Further, the at least one user device may include a smartphone, a tablet, a laptop, a personal computer and so on.

Figure 10:
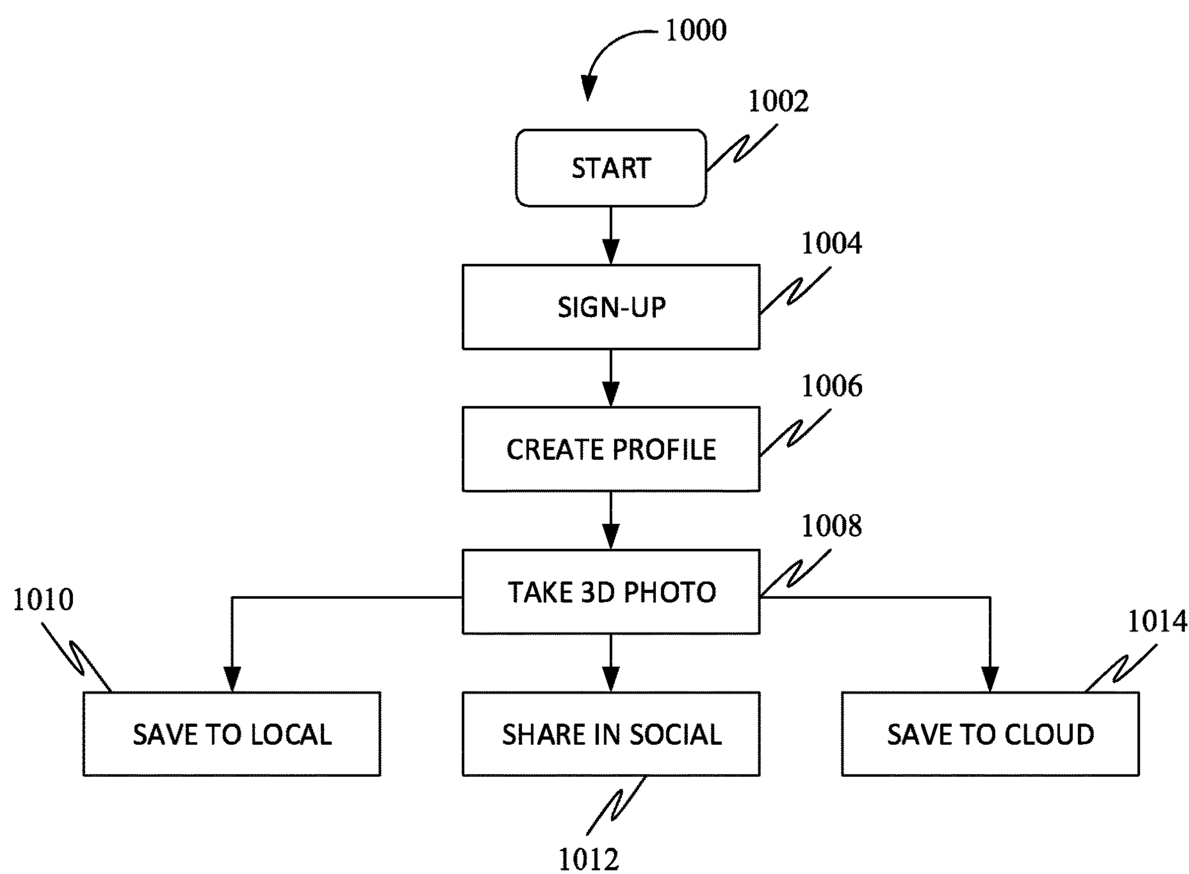
FIG. 10 is a flow diagram of a method to facilitate the generation of a 3D digital object using a software application, in accordance with some embodiments.

FIG. 10 is a flow diagram of a method 1000 to facilitate the generation of the 3D digital object over a software application, in accordance with some embodiments. Accordingly, at 1002, the method 1000 may include a starting step. Further, the starting step may facilitate the initiation of the method 1000.

Further, at 1004, the method 1000 may include a step of signing up of the at least one user. Further, the at least one user may include an individual, an institution, and an organization that may want to generate 3D digital objects from 2D images. Further, the signing up may include logging in to the software application by using social media credentials or by generating new login credentials. Further, the social media credentials may include an email address and a password associated with a social media profile of the at least one user. Further, the at least one user may generate the new login credentials to log in to the software application. Further, the new login credentials may include a username and a password associated with the at least one user.

Further, at 1006, the method 1000 may include a step of creating a profile over the software application. Further, the profile may be associated with the at least one user. Further, generation (creation) of the profile may include providing the account details associated with the at least one user. Further, the account details may include a photo, a name, an email, a nickname, a phone number, a location, a password, and an about me text. Further, the about me text may include at least one word associated with the at least one user.

Further, at 1008, the method 1000 may include a step of taking a 3D photo. Further, the 3D photo may include a 3D digital object that may be generated by the software application. Further, the 3D digital object may refer to a 3D mathematical representation of the at least one 3D object, that may be displayed on the at least one user device Further, at 1010, the method 1000 may include a step of saving the 3D digital object in the at least one local device associated with the at least one user. Further, the local device may include a smartphone, a tablet, a laptop, and a personal computer that may save (or store) the 3D digital object.

Further, at 1012, the method 1000 may include a step of sharing the 3D digital object over a social media network. Further, the 3D digital object may be shared by the at least one user. Further, the social media network may include Facebook™, Instagram™ and so on.

Further, at 1014, the method 1000 may include a step of saving the 3D digital object to a cloud storage portal. Further, the cloud storage portal may include a storage that may store digital data in logical pools. Further, the cloud storage portal may be associated with the software application.

Figure 11:
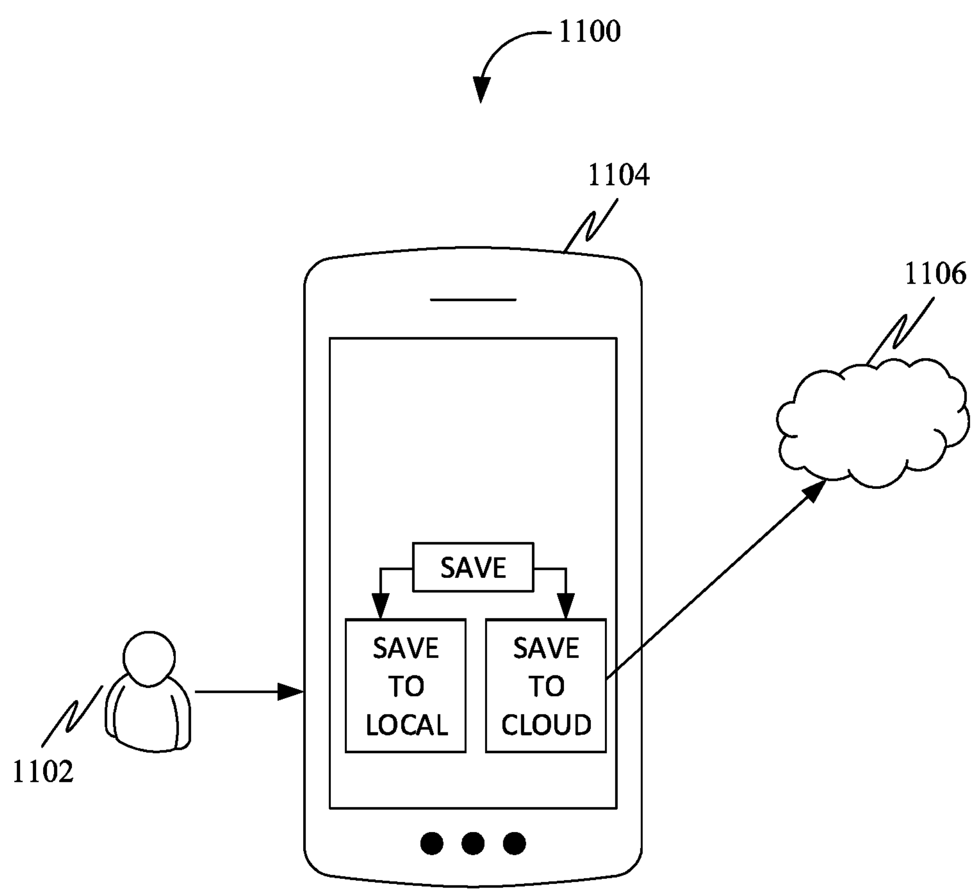
FIG. 11 is a schematic of a user device configured for storing a digital content associated with at least one user using a software application, in accordance with some embodiments.

FIG. 11 is a schematic of a user device 1104 configured for storing a digital content associated with at least one user 1102 using a software application, in accordance with some embodiments. Accordingly, the digital content may include at least one 2D image, 3D digital object. Further, the at least one user may include an individual, an institution, and an organization that may want to store the digital content. Further, the 3D digital object may refer to a 3D geometric representation of the at least one 3D object, that may be stored and displayed on the at least one user device. Further, the at least one 2D image may refer to a binary representation of at least one visual information. Further, the at least one visual information may include drawing, picture, graph, logo, etc. Further, the 2D image may be associated with at least one format. Further, the at least one format may include .JPEG, .GIF, .PNG, .BMP, .PGM, .BAT, .BPG and so on. Further, the method 1100 may include a user interface provided by the software application. Further, the user interface may facilitate the selection of the storage associated with the digital content. Further, the user interface may provide an option to select a local device or a cloud storage portal 1106 to store the digital content. Further, the local device may include a smartphone, a tablet, a laptop, and a personal computer that may save (or store) the 3D digital object. Further, the cloud storage portal 1106 may include a storage that may store digital data in logical pools. Further, the cloud storage portal 1106 may be associated with the software application. Further, the digital content may be stored over the cloud storage portal 1106 based on the subscription status associated with the software application.

Figure 12:
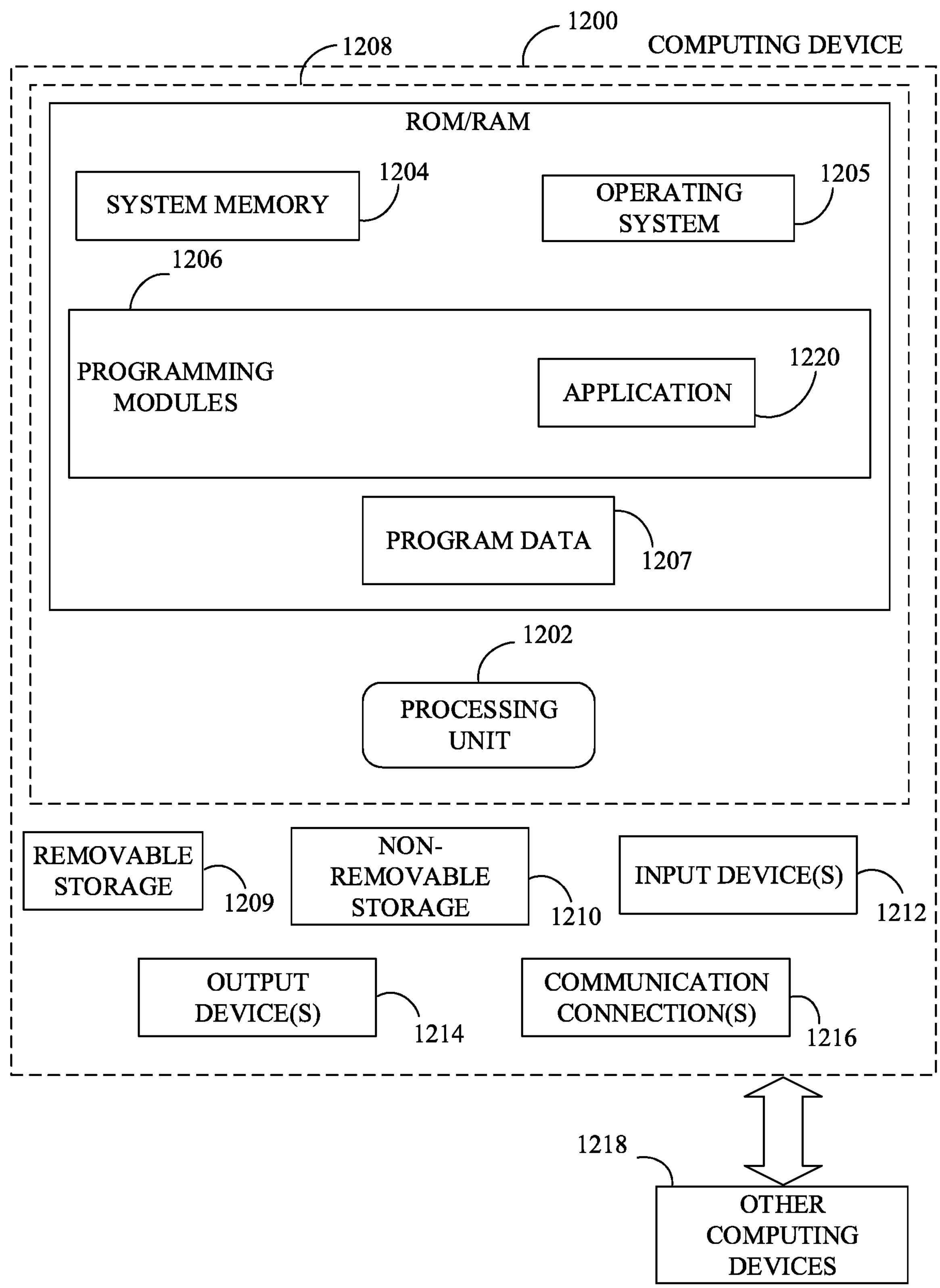
FIG. 12 is a block diagram of a computing device for implementing the methods disclosed herein, in accordance with some embodiments.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random-access memory (RAM)), non-volatile (e.g. read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, a location sensor, a camera, a biometric sensor, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., application 1220 such as a media player) may perform processes including, for example, one or more stages of methods, algorithms, systems, applications, servers, databases as described above. The aforementioned process is an example, and processing unit 1202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for facilitating the generation of 3D digital objects from 2D images, the method comprising:

receiving, using a communication device, a plurality of 2D images associated with a 3D object from at least one user device, wherein the at least one user device comprises at least one image sensor, wherein the at least one image sensor is configured to generate the plurality of 2D images;

processing, using a processing device, at least one 2D image of the plurality of 2D images to identify the 3D object;

retrieving, using a storage device, at least one additional 2D image associated with the 3D object from a database based on the processing;

analyzing, using the processing device, the plurality of 2D images and the at least one additional 2D image;

generating, using the processing device, a 3D digital object based on the analyzing; and storing, using the storage device, the 3D digital object.

2. The method of claim 1, wherein the at least one image sensor is configured to be positioned at a plurality of viewpoints to generate the plurality of 2D images corresponding to the plurality of viewpoints, wherein the plurality of viewpoints is associated with the 3D object, wherein the plurality of viewpoints lies on at least one curve, wherein the at least one curve encompasses the 3D object along at least one plane, wherein the at least one plane passes through the 3D object.

3. The method of claim 1, wherein the at least one 2D image comprises a representation of a predetermined reference object, wherein the method further comprising:

analyzing, using the processing device, the at least one 2D image to identify the predetermined reference object; and determining, using the processing device, at least one 3D object parameter based on the analyzing, wherein the processing device is configured to generate the 3D digital object based on the plurality of 2D images and the at least one 3D object parameter.

4. The method of claim 1 further comprising:

receiving, using the communication device, at least one object sensor data associated with the 3D object from the at least one user device, wherein the at least one user device comprises at least one object sensor configured to generate the at least one object sensor data; and analyzing, using the processing device, the plurality of 2D images and the at least one object sensor data to obtain at least one 3D object parameter, wherein the processing device is configured to generate the 3D digital object based on the plurality of 2D images and the at least one 3D object parameter.

5. The method of claim 1 further comprising:

receiving, using the communication device, at least one query from at least one user device associated with at least one user;

analyzing, using the processing device, the at least one query;

retrieving, using the storage device, the 3D digital object from a database; and transmitting, using the communication device, the 3D digital object to the at least one user device.

6. The method of claim 1 further comprising:

transmitting, using the communication device, the 3D digital object to a first user device associated with a first user, wherein the first user device is communicatively coupled with a plurality of user devices over at least one of a wired communication channel and a wireless communication channel, wherein the first user device is configured to transmit the 3D digital object to the plurality of user devices associated with a plurality of users;

receiving, using the communication device, a plurality of responses associated with the 3D digital object from the plurality of user devices; and transmitting, using the communication device, the plurality of responses associated with the 3D digital object to the plurality of user devices.

7. The method of claim 1, wherein the 3D digital object is associated with three reference axes, wherein the three reference axes are mutually perpendicular, wherein the three reference axes comprises a vertical reference axis, a lateral reference axis, and a longitudinal reference axis, wherein the 3D digital object is configured to rotate about an axis through a plurality of positions, wherein the axis is determined thorough a plurality of coordinates associated with each of the vertical reference axis, the lateral reference axis, and the longitudinal reference axis, wherein the plurality of positions corresponds to a plurality of facets associated with the 3D digital object.

8. The method of claim 7 further comprising:

receiving, using the communication device, a transitional action associated with the 3D digital object from the at least one user device, wherein the transitional action is associated with the axis about which the 3D digital object rotates through the plurality of positions;

analyzing, using the processing device, the transitional action to determine the position of the 3D digital object about the axis;

generating, using the processing device, the facet corresponding to the position based on the analyzing; and transmitting, using the communication device, the facet to the at least one user device.

9. The method of claim 8, wherein the at least one user device comprises at least one action sensor, wherein the at least one action sensor is configured to generate the transitional action.

10. The method of claim 8 further comprising:

identifying, using the processing device, a transitional sound corresponding to the facet; and transmitting, using the communication device, the facet and the transitional sound to the at least one user device.

11. A system for facilitating the generation of 3D digital objects from 2D images, the system comprising:

a communication device configured for receiving a plurality of 2D images associated with a 3D object from at least one user device, wherein the at least one user device comprises at least one image sensor, wherein the at least one image sensor is configured to generate the plurality of 2D images;

a processing device configured for:

processing at least one 2D image of the plurality of 2D images to identify the 3D object;

analyzing the plurality of 2D images and at least one additional 2D image;

generating a 3D digital object based on the analyzing;

a storage device configured for:

retrieving the at least one additional 2D image associated with the 3D object from a database based on the processing; and storing the 3D digital object.

12. The system of claim 11, wherein the at least one image sensor is configured to be positioned at a plurality of viewpoints to generate the plurality of 2D images corresponding to the plurality of viewpoints, wherein the plurality of viewpoints is associated with the 3D object, wherein the plurality of viewpoints lies on at least one curve, wherein the at least one curve encompasses the 3D object along at least one plane, wherein the at least one plane passes through the 3D object.

13. The system of claim 11, wherein the at least one 2D image comprises a representation of a predetermined reference object, wherein the system further comprising:

the processing device configured for:

analyzing the at least one 2D image to identify the predetermined reference object; and determining at least one 3D object parameter based on the analyzing, wherein the processing device is configured to generate the 3D digital object based on the plurality of 2D images and the at least one 3D object parameter.

14. The system of claim 11 further comprising:

the communication device configured for receiving at least one object sensor data associated with the 3D object from the at least one user device, wherein the at least one user device comprises at least one object sensor configured to generate the at least one object sensor data; and the processing device configured for analyzing the plurality of 2D images and the at least one object sensor data to obtain at least one 3D object parameter, wherein the processing device is configured to generate the 3D digital object based on the plurality of 2D images and the at least one 3D object parameter.

15. The system of claim 11 further comprising:

the communication device configured for:

receiving at least one query from the at least one user device associated with at least one user;

transmitting the 3D digital object to the at least one user device;

the processing device configured for analyzing the at least one query; and the storage device configured for retrieving the 3D digital object from a database.

16. The system of claim 11 further comprising:

the communication device configured for:

transmitting the 3D digital object to a first user device associated with a first user, wherein the first user device is communicatively coupled with a plurality of user devices over at least one of a wired communication channel and a wireless communication channel, wherein the first user device is configured to transmit the 3D digital object to the plurality of user devices associated with a plurality of users;

receiving a plurality of responses associated with the 3D digital object from the plurality of user devices; and transmitting the plurality of responses associated with the 3D digital object to the plurality of user devices.

17. The system of claim 11, wherein the 3D digital object is associated with three reference axes, wherein the three reference axes are mutually perpendicular, wherein the three reference axes comprises a vertical reference axis, a lateral reference axis, and a longitudinal reference axis, wherein the 3D digital object is configured to rotate about an axis through a plurality of positions, wherein the axis is determined thorough a plurality of coordinates associated with each of the vertical reference axis, the lateral reference axis, and the longitudinal reference axis, wherein the plurality of positions corresponds to a plurality of facets associated with the 3D digital object.

18. The system of claim 17 further comprising:

the communication device configured for:

receiving a transitional action associated with the 3D digital object from the at least one user device, wherein the transitional action is associated with the axis about which the 3D digital object rotates through the plurality of positions;

transmitting the facet to the at least one user device;

the processing device configured for:

analyzing the transitional action to determine the position of the 3D digital object about the axis; and generating the facet corresponding to the position based on the analyzing.

19. The system of claim 18, wherein the at least one user device comprises at least one action sensor, wherein the at least one action sensor is configured to generate the transitional action.

20. The system of claim 18 further comprising:

the processing device configured for identifying a transitional sound corresponding to the facet; and the communication device configured for transmitting the facet and the transitional sound to the at least one user device.

* * * * *